T. J. COSTELLO.

ANNEALING FURNACE.

APPLICATION FILED JUNE 9, 1920.

Reissued Dec. 21, 1920.

15,011.

3 SHEETS—SHEET 1.

WITNESSES

J. Herbert Bradley

INVENTOR

Thomas J. Costello by Dannis Wolcott

Atty

T. J. COSTELLO.

ANNEALING FURNACE.

APPLICATION FILED JUNE 9, 1920.

Reissued Dec. 21, 1920. 15,011.

3 SHEETS—SHEET 2.

WITNESSES

J. Herbert Bradley.

INVENTOR

Thomas J. Costello.

by Damon S. Wolcott atty

T. J. COSTELLO.

ANNEALING FURNACE.

APPLICATION FILED JUNE 9, 1920.

Reissued Dec. 21, 1920. 15,011.

3 SHEETS—SHEET 3.

WITNESSES

G. Hebel Bradley

INVENTOR

Thomas J. Costello by Barnes & Wolcott

Atty

UNITED STATES PATENT OFFICE.

THOMAS J. COSTELLO, OF TRUMBULL, OHIO, ASSIGNOR TO GEORGE J. HAGAN COMPANY, OF PITTSBURGH, PENNSYLVANIA, A CORPORATION OF PENNSYLVANIA.

ANNEALING-FURNACE.

15,011. Specification of Reissued Letters Patent. Reissued Dec. 21, 1920.

Original No. 1,336,681, dated April 13, 1920, Serial No. 139,527, filed December 29, 1916. Application for reissue filed June 9, 1920. Serial No. 387,762.

*To all whom it may concern:*

Be it known that I, THOMAS J. COSTELLO, a citizen of the United States, and resident of Warren, in the county of Trumbull and State of Ohio, have invented certain new and useful Improvements in Annealing-Furnaces, of which improvements the following is a specification.

This invention relates to improvements in furnaces used for annealing metals, in which long pieces, as for instance steel plates, are inserted in one end and discharged at the other end, with the mechanical assistance of carrying rollers; and the objects of my invention are, first, to greatly economize the operating cost by providing means for easily, quickly and cheaply renewing said rollers when requisite so to do; second, to reduce to a minimum the portions of said rollers in contact with the heat of the interior of said furnaces and their annealing contents; and, third, to provide means for utilizing said rollers for equalizing the temperatures in opposite ends and throughout said furnaces.

I attain these objects by the mechanism illustrated in the accompanying drawings, in which:—

Figure 2:
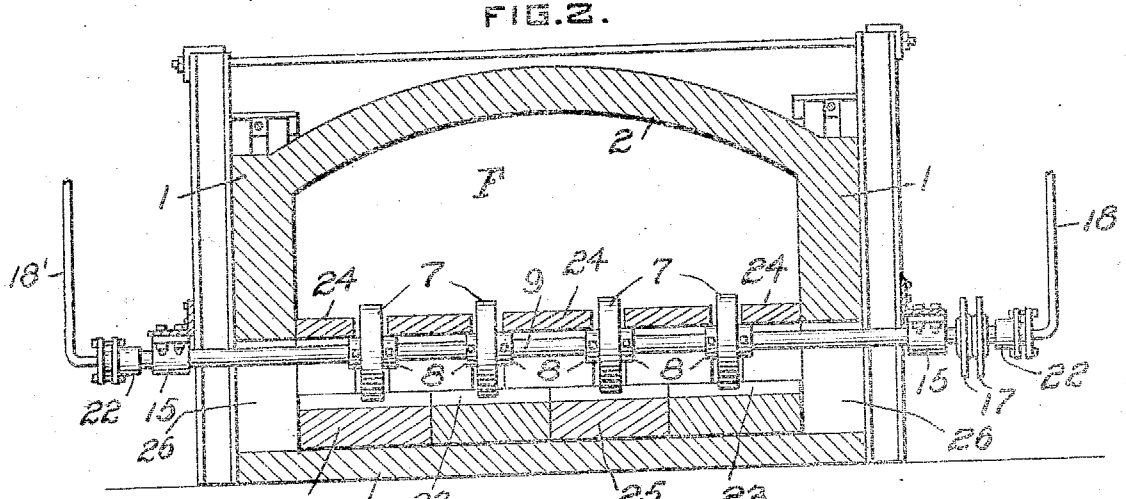
Figure 1:
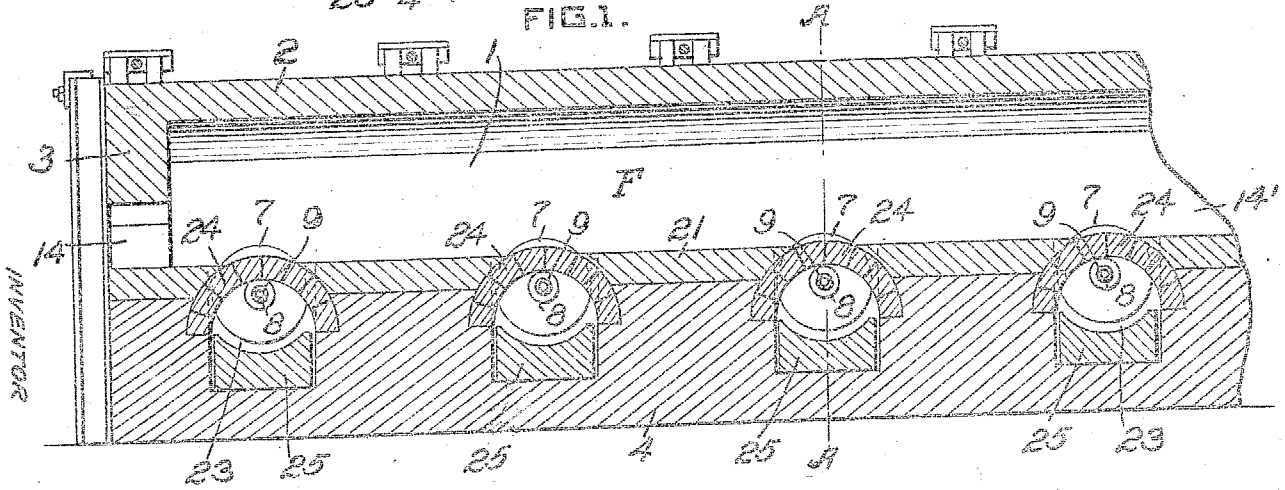
Figure 4:
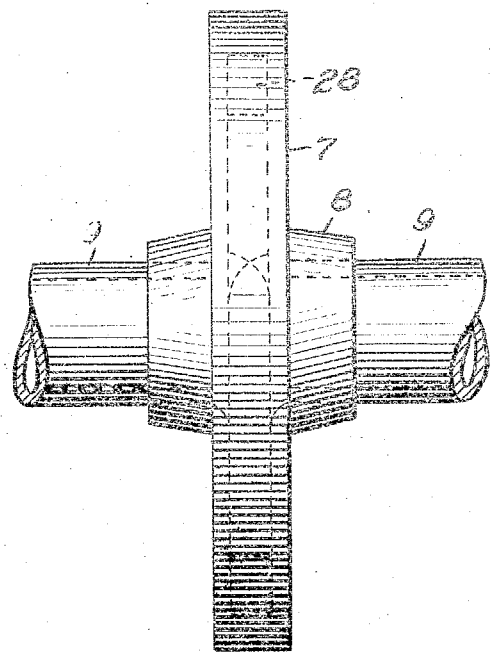
Figure 3:
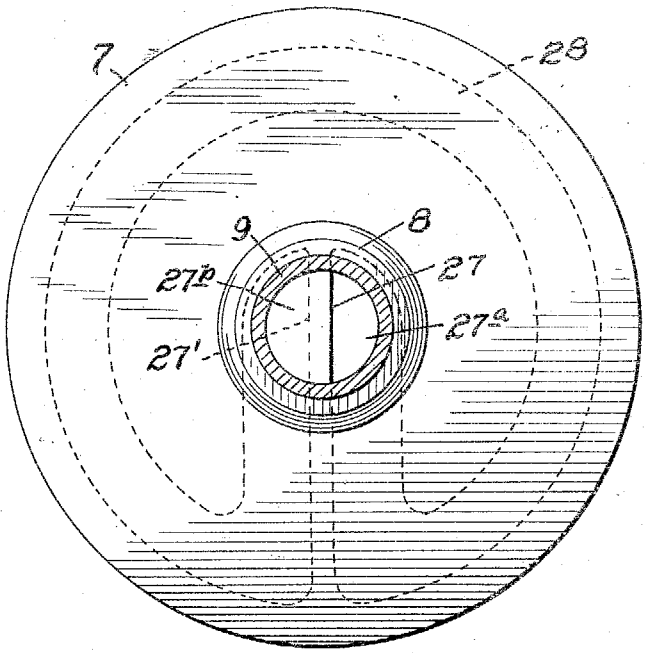

Figure 1 is a view of the interior of my furnace taken lengthwise, partly in section and broken away at the rear end. Fig. 2 is a view partly in section, taken through the line A—A of Fig. 1; Fig. 3 is a side elevation of a roller and Fig. 4 is an edge elevation of the same.

Figure 5:
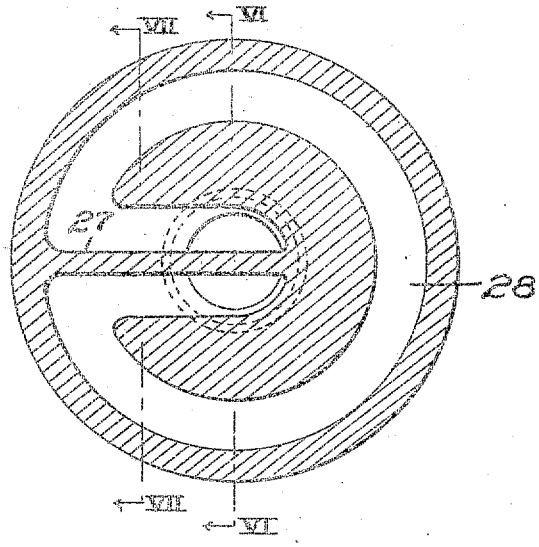
Figure 6:
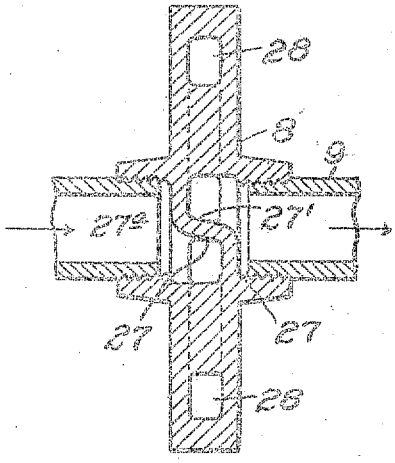
Figure 7:
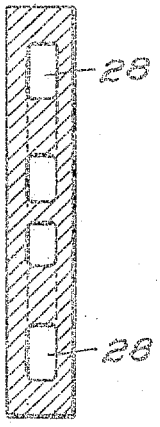

Fig. 5 is a view of a hollow roller in section taken through the center of its hub; Fig. 6 and Fig. 7 are sectional views on planes indicated by the lines VI—VI and VII—VII, Fig. 5.

Similar characters refer to like parts throughout the several views.

A furnace is inclosed by side walls 1, 1; an arched roof 2, end walls 3, and a bottom 21, on a base 4; all of refractory material.

Charging openings 14 for the reception of the plates or other articles to be annealed are formed in the front end of the furnace. The charging openings are provided with suitable doors (not shown) as is the usual practice and suitable provision is made for heating the chamber, the fire box for such purpose being located adjacent to the front end of the furnace as is the usual practice.

A series of channels are formed at right angles to the direction of movement of articles through the furnace, in the bed or hearth of the furnace and within these channels are arranged shafts 9 which are mounted in bearings 15, suitably supported by the side walls of the furnace, a series of suitably spaced rollers 7 are carried by each of these shafts, the shafts being supported by their bearings so that only a small portion of the rollers will project above the hearth of the furnace, as clearly shown in Figs. 1 and 2. These shafts are rotated by any suitable means, *i. e.* by sprocket chains passing around pulleys "17" as shown in Fig. 2. While any suitable means may be employed for cooling the rollers, it is preferred that they may be formed with passages therethrough having their inlets and outlets formed by the hubs 8 which are made hollow and are internally threaded for the reception of short pipe sections forming the shafts for the rollers. The end sections of the shafts are connected respectively preferably through packing boxes to water supply pipes 18 and outlet pipes 18′, as shown in Fig. 2.

The channels extend through the side walls of the furnace and are made of transverse dimensions so as to permit of the rollers being lowered thereunto and shifted along so as to permit renewal of the rollers when necessary. While the ports 26 at the ends of the channels will be normally closed by brick work or in any other suitable manner so as to prevent the inflow of air, it is preferred to also place removal blocks 25 in the channels as shown in Figs. 1 and 2. The channels intermediate the rollers are covered by arches 24 which serve to protect the shafts 9 from excessive heating.

As to the rollers, Figs. 3 to 7, the stream of cold water flowing in from pipe 18 and out through pipe 18′ (Fig. 2) enters each of the hubs 8, 8, through the shafts 9, 9, until it strikes a deflecting wall 27 and a dead end $27^a$, (in each) whence it passes around through the chamber 28 and close to the periphery thereof, until it meets the other side of the wall 27 at 27′, whence it is forced against a second dead end, $27^b$, near the center of the roller and oppositely faced to end $27^a$ and out through the opposite hollow shaft portion 9; and in like course through all the rollers of that series, out to and through the exit pipe 18′.

In practice large steel (or other) plates of great length and breadth, as for steel car or armor plate construction, are passed in to the opened port 14 and taken in and over the trains of rollers 7, 7, until inclosed in the furnace whose exit port is shut; whereupon the entrance port 14 is closed.

The extreme heat of the front or charging end of the furnace tends to overheat the rollers 7, 7, at the end and to raise the temperature of the front end of the furnace and the series of rollers nearest to it to a higher degree than that of the exit end and the rear rollers.

It is essential that the entire furnace should be kept at as nearly a uniform temperature as possible to produce a uniform temper in the annealed metal. Wherefore, while I am aware it is not new to restrain the temperature of rolls by flowing water through their centers or axles; and also that water circulating interiorly of rapidly driven fly wheels of speed motors and the like in chambers near their peripheries has been employed, I do not claim either of these methods or uses as novel in my invention *per se*, since as the use of shafts, disks or furnace chambers are not new *per se;* what I do claim for them as novel in their adaptation for use in my improved furnace will be clearly differentiated and set forth specifically in my claims relative thereto, as hereinafter written.

With that in view attention is called to the fact that I prefer to use my improved hollow rollers as shown in Figs. 3 and 4 only at the front or charging end of my furnace adjacent to the entrance port 14, leaving the corresponding series of rollers near the exit or rear end of the furnace as being of solid disk construction with water passages through their respective hubs only.

My said invention in that regard results in a most important improvement in the art of annealing said large plates in large furnaces, which would not be material in small furnaces as now used where the interior is easily maintained at a practically uniform temperature, in that the rear rollers soon become much hotter than the forward rollers and help raise the cooling rear ends of the plates and the back of the furnace to a temperature more nearly uniform with that of the entrance end; in that way making a correct annealing of said large plates alone practicable.

In present practice when corresponding rolls or rollers have been superheated so as to have deteriorated, it is necessary to shut down the furnace; tear its base apart and substitute new rolls or rollers at very great loss of time and money.

Therefore I have provided the block beds, 25, 25, as illustrated, and in practice, when renovation is needed, the outer ends of ports 26, 26, are opened; the successive block beds 25, 25, are pulled out therethrough in series; the shafts 9, 9, and with them the rollers 7, 7, are dropped down in the chambers 23, 23, to where said block beds were, and the rollers 7, 7, themselves are pulled out through said ports 26, 26, and new ones substituted for them on the shaft members 9, 9; and the whole quickly reassembled for immediate use.

I have illustrated and described my invention and improvements with such clearness that any one skilled in the art of furnace construction can build furnaces in conformity therewith and with modifications adapted to the specific classes of divers annealing furnaces without departing from my invention.

It is characteristic of the improvement described and claimed herein that while provision is made for the projection into the heating chamber of sufficient portions of the feeding disks to effect the movement of sheets through the furnace, other portions and the shaft carrying the disks are outside of the direct flow of heat and to a large extent protected by the hearth. In order to prevent injury to the hearth, when it becomes necessary to renew the feed disks, provision is made for shifting the shaft laterally to move the disks out of the plane of the hearth and into alinement with an opening in a wall of the furnace, through which the shaft carrying the disks can be moved longitudinally.

I claim:

1. The combination of an annealing furnace of the kind described and having an entrance port at the firing and charging end and an exit port at the opposite end; and rollers in a plurality of latitudinal series located at its bottom on revoluble shafts below the line of said bottom a distance but slightly less than the radii of said rollers; with chambers below said bottom opening at their tops thereinto and receiving said rollers; arches adjacent to the sides of said rollers surmounting the lateral walls of said chambers and protruding slightly into said furnace but less than do said rollers; bed blocks fitting into the bottoms of said chambers under said rollers, their hubs and portions of their sustaining shafts; and ports at the sides of said furnace, in line horizontally with said bed blocks, positioned and of capacity for the withdrawal of said bed blocks, rollers and shafts therethrough for the purpose set forth.

2. In a furnace of the kind described, having rollers mounted in latitudinal series on shafts below the bottom of said furnace and rotating in chambers in its base, bed blocks under said rollers substantially filling the portions of said chambers not occupied by said rollers, and lateral ports in line with the shafts of said rollers for the removal thereof therethrough for the purpose set forth.

3. In a furnace of the kind described, rollers positioned in series in a base at the bottom thereof and protruding a fraction of the length of their radii thereinto; lateral ports in the walls of said furnace in horizontal line with said series of rollers respectively and means for withdrawing said rollers through said ports as shown and described.

4. An annealing furnace having a hearth provided with transverse openings and with charging and discharging openings at its respective ends in combination with means for moving articles through the furnace consisting of a series of shafts arranged transversely of the furnace and below the openings in the hearth and each shaft carrying a plurality of spaced rollers, the shafts being located distances below the upper surface of the hearth less than the lengths of the radii of the rollers, whereby only small portions of the rollers will project above the hearth.

5. An annealing furnace having charging and discharging openings, a hearth provided with a plurality of series of openings, shafts provided with spaced disks adapted to project into the openings in the hearth, bearings for said shafts arranged to so support the shafts below the level of the hearth that small portions of the disks will project from said openings above the hearth, and so constructed that the shafts may be moved laterally therefrom, a side wall of the furnace being provided with openings arranged to permit the shafts and disks after being shifted laterally to be moved longitudinally out of the furnace.

6. An annealing furnace provided with a heating chamber, a shaft provided with a plurality of spaced disks, bearings for so supporting the shaft as to permit of its being moved laterally for removal from the heating chamber, a hearth having its upper surface on a plane a distance above the axis of the shaft less than the radii of the disks so that small portions of the disks will project above the hearth, and refractory material extending between adjacent disks and above the shaft.

7. Rollers for receiving and transporting plates in an annealing furnace, rotated by hollow shafts, and having chambers leading to dead ends near the centers thereof, and to interior partition walls; thence partly around their interiors near their peripheries to other oppositely disposed dead ends and the opposite faces of corresponding interior partition walls and thence outwardly through the hubs of said rollers, as shown and described.

8. An annealing furnace, a plurality of shafts supported transversely of the furnace, each shaft being provided with a plurality of disks, means for rotating a plurality of said shafts to advance the sheets through the furnace, means intermediate the adjacent shafts for supporting the sheets as they pass from the disks on one shaft to the disks on the next adjacent shaft, the supporting and guiding surfaces of said intermediate supports being so located relative to the axes of the shafts that an advancing sheet or plate would abut against the peripheries of the disks at points substantially above the axes of the shafts, a side wall of the furnace having openings arranged to permit of the longitudinal movement of the shafts carrying the disks from the furnace.

In testimony whereof I have hereunto set my hand this 25 day of May, 1920.

THOMAS J. COSTELLO.